(No Model.)
R. R. WILLIAMS.
INDEX CIRCULAR.
No. 411,315. Patented Sept. 17, 1889.
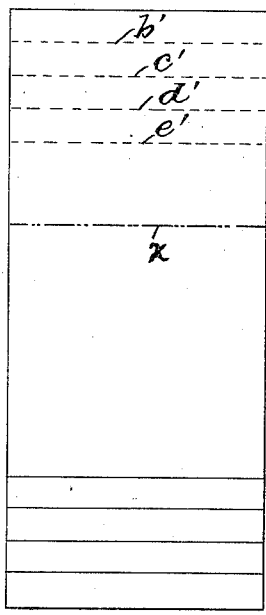
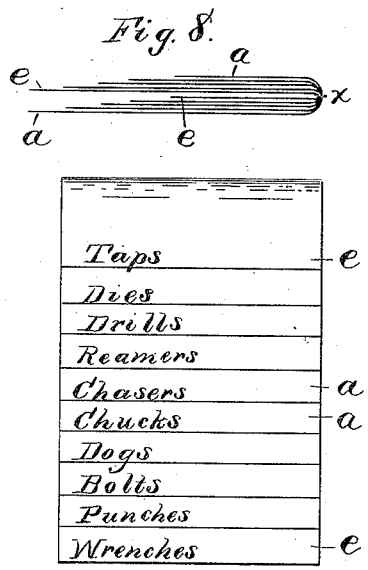
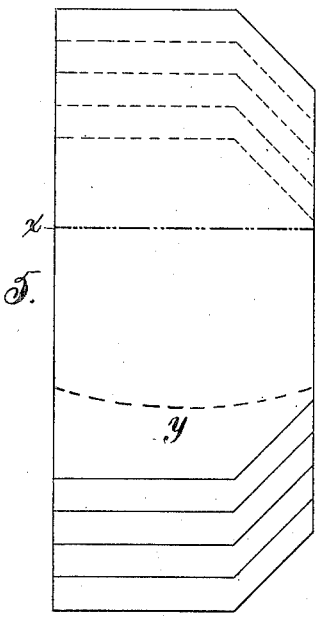
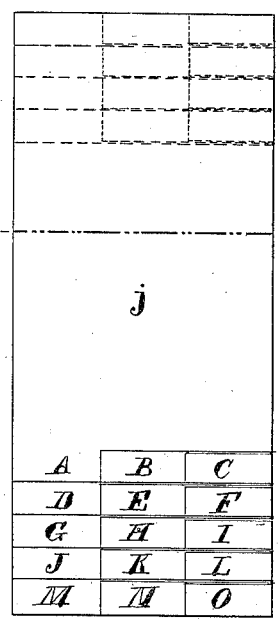

UNITED STATES PATENT OFFICE.

RICHARD R. WILLIAMS, OF BROOKLYN, NEW YORK.

INDEX-CIRCULAR.

SPECIFICATION forming part of Letters Patent No. 411,315, dated September 17, 1889.

Application filed October 4, 1888. Serial No. 287,227. (No model.)

*To all whom it may concern:*

Be it known that I, RICHARD R. WILLIAMS, a citizen of the United States, residing at Brooklyn, Kings county, New York, have invented certain new and useful Improvements in Index-Circulars, fully described and represented in the following specification and the accompanying drawings, forming a part of the same.

The object of this invention is to furnish a circular or pamphlet consisting in a single group of leaves with a convenient and prominent index to indicate its contents; and the invention is particularly adapted for presenting advertisements in a novel and attractive form, and may be used for printed circulars, or, when made in blank form, for pasting in papers or scraps and indexing the same.

The invention consists, primarily, in a pamphlet formed of a single series of leaves successively shortened at their ends for the application of a series of titles.

It also consists, secondarily, in a pamphlet having a series of leaves of uniform length and width laid upon one another with their opposite ends overlapped and united transversely to their overlapped ends.

The invention will be understood by reference to the annexed drawings, in which—

Figure 1 is an edge view of a group of sheets laid upon one another with the ends overlapped. Fig. 2 is a plan of the same, with the line of stitching represented by a dotted line $x$. Fig. 3 represents the group of leaves folded upon such line of stitching. Fig. 4 is a plan of the same after folding. Fig. 5 is a plan similar to Fig. 2, with the corners of the leaves upon opposite ends cut off at one side thereof. Fig. 6 is an edge view of several series of leaves laid upon one another with the ends overlapped. Fig. 7 is a plan of the same, with a line of stitching represented in the dotted line $x$ and the ends of the outer leaves in each series notched to expose the under leaves of the same series, and Fig. 8 a modification.

Fig. 1 shows the means by which a series of sheets of uniform length may be made to form a folded pamphlet, having a series of leaves successively shortened. $a\ b\ c\ d\ e$ are the successive leaves laid upon one another, with the ends overlapped uniformly and the stitching $x$ applied to the same transversely at a point nearer one end of the top leaf than the other, so that when the top leaf $a$ is folded one of its ends will fall short of the other in the same manner that such end falls short of the end of the leaf $b$. This effect is clearly perceptible in Fig. 2, which shows a plan of the top leaf $a$, with the ends of the other leaves at the bottom of the figure projecting from beneath it, with the shortened ends of such under leaves indicated by dotted lines $b'$, $c'$, $d'$, and $e'$ at the upper end of the figure. The upper end of the leaf $a$ above the line of stitching $x$ is shown a little shorter than the lower end of the same leaf, so that when folded at the line $x$, as shown in Fig. 3, the ends of the leaf $a$ bear the desired relation to one another.

Fig. 4 shows a plan of the entire pamphlet when thus folded and ready for use. In Fig. 4 titles are shown applied to the exposed edges of the under leaves, which afford a convenient means of reference to the contents of such leaves, and such titles may be printed upon the leaves before they are attached together or may be applied to the leaves by the user at pleasure. The interior of the leaves may be provided with printed matter, as in various forms of circulars and catalogues, the exterior titles giving reference to such matters, or the interior of the leaves may be used as files or scrap memorandum-books in which matter may be written or pasted.

Figs. 5, 6, and 7 show modifications of the invention, the first being adapted chiefly to give an ornamental appearance to the edges of the leaves, while it also facilitates the application of more titles to the edges thereof, while Figs. 6 and 7 show a means of making a pamphlet of the same length as in Fig. 2, with a larger number of leaves and more titles.

In Fig. 5 the end corners of the leaves at one side thereof are shown cut off at an angle of forty-five degrees, by which means the edges of all the leaves when folded upon the line $x$ exhibit two edges inclined toward one another instead of a single straight edge, as shown in Fig. 2. Such form of the leaves presents a novel and attractive appearance, and it is obvious that the other corners of the leaves might be shaped in a similar manner, or that the entire edge of the leaf may be made with curved contour, as indicated in the dotted line $y$, Fig. 5.

In Fig. 6 several series of leaves, marked, respectively, $f, g, h, i$, and $j$, are shown, all the leaves being of uniform length, and each series being overlapped upon the preceding series, like the single leaves shown in Figs. 1 and 3. When folded upon the line $x$, the pamphlet would present the same appearance as that in Fig. 4, but the outer edge of the three leaves in each series would coincide. By forming notches of different lengths in the two outer leaves of each series the two under leaves of such series are exposed to apply a title, and three times as many leaves are used and three times as many titles are displayed in a pamphlet of the same length and width. Three leaves being shown in each series and five series in the pamphlet, fifteen titles represented by letters of the alphabet are therefore shown at one end of the leaves in the plan in Fig. 7.

With my construction some of the leaves in the pamphlet are much shorter than others; but such defect is compensated for in a certain degree by the cheapness of the construction and the large area exposed for the titles, while the novelty of the construction adapts it for circulars and other purposes where an attractive display constitutes the chief feature of the document.

From the above description it will be seen that my invention consists fundamentally in shortening all the leaves of a pamphlet successively to expose the edges for the application of titles, and that the mode of construction may be extended and a larger pamphlet formed with the same generic feature by forming each series of several leaves with the ends coincident. The separate leaves in such series may be notched, as shown in Fig. 7, or, if preferred, they may be used without notches and the nature of their contents indicated by the title upon the first leaf.

For certain purposes my construction may be used without folding, the leaves being stitched transversely with the ends overlapped, as shown in Fig. 2, and the indices applied to the overlapping ends of the leaves at their opposite ends. When the construction is formed in a series of uniform sheets successively overlapped, as shown in the drawings, duplex pamphlets having the same characteristics duplicated may be formed by securing the series of sheets together at a different line midway between their ends and folding them, as shown in Fig. 3. Such duplex pamphlet is shown in Fig. 8 with the end of the sheet $a$ even with the end of sheet $e$ and containing two similar groups of five leaves each.

I am aware of United States Patents No. 310,329, issued January 6, 1885, to S. S. Stevens, and No. 324,584, issued August 18, 1885, to B. M. Paine, the said patent to Stevens showing a single series of leaves notched at their edges to expose portions of the leaves for the application of titles, and Paine's patent showing six different series of leaves, which series are successively shortened, although the leaves in each series are of the same length and width, with notched edges to apply reference-letters. I wholly disclaim the said patents, as well as the application of notches to leaves of uniform size, as I am aware that such construction has long been used. I am not aware, however, that any single series of leaves has been united together at one end of such leaves with the opposite ends successively shortened to expose a portion of each leaf in the series for the application of a title.

Having thus set forth my invention, what I claim herein is—

1. A pamphlet having a series of leaves of uniform length and width laid upon one another, with their opposite ends overlapped and united transversely intermediate to such overlapped ends, substantially as herein set forth.

2. A pamphlet having a series of leaves of uniform length and width laid upon one another, with their opposite ends overlapped and united transversely intermediate to such overlapped ends and folded upon their line of union, substantially as herein set forth.

3. A pamphlet having a series of leaves of uniform length and width laid upon one another, with their opposite ends overlapped and united transversely intermediate to such overlapped ends upon a line adapted to form the opposite ends of the leaves into a single series with uniform interspaces when folded upon such line, as and for the purpose set forth.

4. A pamphlet having several series of leaves of uniform length and width, the leaves of each series having their edges coincident, and the several series being laid upon one another with their ends overlapped and united upon a line intermediate to such overlapped ends, and the outer leaves of each series being separately notched to expose the inner leaves of each series, as and for the purpose set forth.

5. A pamphlet consisting in a single series of leaves joined together at one end and successively shortened at their opposite ends for the application of a series of titles, substantially as herein set forth.

In testimony whereof I have hereunto set my hand in the presence of two subscribing witnesses.

RICHARD R. WILLIAMS.

Witnesses:
JOHN S. WING,
HENRY J. MILLER.